United States Patent Office 3,371,122
Patented Feb. 27, 1968

3,371,122
CONTINUOUS PROCESS FOR THE NITRATION OF XYLENE
Reinhold Betschel, Wilmington, Del., assignor to E. I. du Pont de Nemours and Company, Wilmington, Del., a corporation of Delaware
No Drawing. Filed Dec. 2, 1966, Ser. No. 598,602
5 Claims. (Cl. 260—645)

ABSTRACT OF THE DISCLOSURE

The present invention relates to a continuous emulsion process for the nitration of xylenes to form mononitroxylenes wherein residence time in the reactor, reaction temperature, degree of agitation and a specific dehydrating value of the sulfuric acid are combined to achieve rapid separation of the product without the need of a separating agent.

Background of invention

Mononitroxylenes have heretofore been produced by a batch process such as that described in U.S. Patent No. 2,400,904, issued to George W. Batchelder. In this batch process xylene and mixed nitric-sulfuric acid are reacted utilizing such strong agitation thatt substantial emulsification as defined by Batchelder exists throughout the reaction mixture. Substantial emulsification as defined by Batchelder means that the layers of acid and nitrocompound are so blended that separation by gravity does not take place for more than ten minutes.

The disadvantages of the relatively long settling time are that it is time consuming and greatly reduces the amount of product output for a given piece of equipment. This disadvantage is recognized in the Batchelder patent, which discloses that this disadvantage may be overcome by the addition of a separation adjuvant.

One can recognize that the addition of a separation adjuvant is costly and adds to the difficulty of obtaining a substantially pure product and that it would be desirable to eliminate this step.

Summary of the invention

In the present invention xylene and mixed nitricsulfuric acid are fed continuously into a reactor. A state of complete emulsification throughout the mixture is created in the reactor by an agitating system. After a short residence time the mixture is continuously discharged into a separating chamber where the product mononitroxylenes are quickly separated from the spent acid layer.

Description of the preferred embodiment

The xylenes employed may be acquired from any convenient source and can be mixed xylenes obtained from petroleum reforming.

The nitrating acid employed in the process of the invention is a mixture of sulfuric and nitric acids in which thte nitric acid is 1.0 to 1.5, preferably 1.05 to 1.15 times the theoretical amount of nitric acid required to nitrate all of the xylene present to mononitroxylene. It has been discovered that when the amount of nitric acid used for this continuous process is more than 1.3 times this theoretical value, the content of by-product dinitroxylene increases sharply, and when the amount of nitric acid is less than 1.05 times this theoretical value, the amount of unreacted xylene increases. The composition of the nitrating acid, i.e., the mixture of nitric acid and sulfuric acid, is best defined by the D.V.S. value. The D.V.S. value is a designation well known in the art representing the dehydrating value of sulfuric acid. The D.V.S. value is defined as the actual sulfuric acid content of the mixed acid divided by the total water present when nitration is completed, both values being on a weight basis. The relationship can be calculated from the equation:

$$D.V.S. = \frac{\text{wt. of } H_2O \text{ at the end of reaction}}{\text{wt. of } H_2SO_4 \text{ used}}$$

In the continuous process of the present invention the D.V.S. value required to obtain the desired results must be controlled within the range of from 2.5 to 3.0.

The reactor may be any closed reactor suitable for continuous nitration operation, preferably constructed of stainless steel and containing internal cooling means for cooling the reaction mixture.

The reaction can be run at any convenient pressure, preferably atmospheric pressure. In the interest of safety it is preferred to run the reaction under an inert atmosphere such as $CO_2$.

By means of the internal cooling means the temperature of the reaction is maintained within the range of from 30° to 60° C., preferably from 40° to 50° C.

The agitating system may be any means, such as a motor driven impeller, capable of producing an agitation energy input in the range of from 15 to 50 horsepower per 1000 gallons of charge, preferably from 25 to 35 horsepower per 1000 gallons. Lower power input results in incomplete emulsification, dead spots in the reactor and only partial nitration of the xylenes with resulting poor yield. Higher power input and resulting greater agitation results in such a high state of emulsification and small droplet size that separation of the emulsion becomes very difficult and consumes long periods of time.

The average residence time in the reactor is from 9 to 18 minutes, preferably within the narrow range of from 12 to 14 minutes. This residence time in the reactor is essential to produce complete reaction and yet mailtain the formation of by-products at a minimum level. The lower limit of the residence time is controlled by the incomplete nitration of xylene and the presence of unreacted xylene in the product. It has been found that longer residence times results in the formation of by-products such as dinitroxylenes, nitrophenols, dinitrophenols, nitrosylsulfuric acid and sulfonated products. The sulfonated products which may constitute several percent of the reaction product, tend to enhance the emulsification, acting as an emulsifier when separation is taking place. The average yield obtained with the batch process using the longer residence time is on the order of 85%. The high yield of mononitroxylene obtained by the continuous process indicates a low formation of the abovementioned sulfonated and/or oxidized products.

The reaction mixture, in the form of an emulsion, is withdrawn from the reactor and fed into a separating chamber. Under the conditions of the continuous process of this invention, the emulsion formed stratifies quickly in the separating chamber without the need for a separation adjuvant. Separation by gravity in the separating chamber takes place in less than one minute. This time period can be reduced if mechanical means such as a centrifuge is used.

The reaction mixture separates into two layers, an upper layer of the product mononitroxylene and a lower layer of spent acid. The mononitroxylene layer is washed with water, and neutralized with alkali, such as caustic soda, ammonia or sodium carbonate. No further treatment is necessary since the mononitroxylene is clear and of high quality.

The lower spent acid layer formed when the batch process is used often is so contaminated with organic material it is discarded. In contrast the lower spent acid layer formed by the continuous process of this invention is clear and is composed of sulfuric acid and water with only trace amounts of nitric acid and organic material. After excess water formed during the reaction is removed the spent acid may be replenished with nitric acid and recycled. Alternatively the sulfuric acid may be recovered from the spent acid for other purposes.

The following example is a representative example illustrating the present invention.

*Example*

Mixed xylenes obtained from petroleum reforming and mixed acid, having a D.V.S. value of 2.66 and consisting of 19.50% by weight nitric acid, 62.53% sulfuric acid and 17.97% water, were fed continuously into a stainless steel reactor at the rate of 2,720 pounds per hour of xylene and 9,340 pounds per hour of acid while maintaining the temperature of the reaction mass at 45° C. The reactor was provided with a motor driven impeller which produced a power input of 30 H.P. per 1000 gallons of reaction mass. Residence time was 14 minutes. The effluent reaction mixture was passed through a centrifuge where the spent acid was separated from the mononitroxylenes. The mononitroxylenes were then led into a continuous wash-mixer and washed with warm water. The slightly acidic mononitroxylenes were separated from the water in a centrifuge, neutralized with caustic soda and washed again with warm water in a counter-current extractor. The clear, amber colored mononitroxylenes were obtained in 95.5% yield, based on the xylene, and contained 0.80% unreacted xylenes, 0.84% dinitroxylenes and 0.011% nitrophenols.

It is to be understood that the preceeding example is representative and that said example may be varied within the scope of the total specification, as understood by one skilled in the art, to produce essentially the same results.

As many widely different embodiments of this invention may be made without departing from the spirit and scope thereof, it is to be understood that this invention is not limited to the specific embodiments thereof, except as defined in the appended claims.

The embodiments of the invention in which an exclusive property or privilege is claimed are defined as follows:

1. A continuous process for the nitration of xylene to form mononitroxylene which process comprises
   (a) reacting xylene with a mixed nitric-sulfuric acid solution having a D.V.S. value of 2.5 to 3.0 under an agitation energy input of from 15 to 50 horsepower per 1000 gallons of reaction mixture, at a reaction temperature from about 30° C. to 60° C. and at a residence time of from about 9 to about 18 minutes, and
   (b) recovering the mononitroxylene from the reaction mixture.

2. The process of claim 1 wherein the mononitroxylene is recovered from the reaction mixture in less than one minute.

3. The process of claim 1 wherein the agitation energy input is from about 25 to 35 horsepower per 1000 gallons of reaction mixture, the reaction temperature is from about 40° C. to 50° C. and the residence time is from about 12 to 14 minutes.

4. The process of claim 3 wherein the mononitroxylene is recovered from the reaction mixture in less than one minute.

5. The process of claim 3 wherein the agitation energy is provided by a motor driven impeller.

References Cited

UNITED STATES PATENTS 2,400,904    5/1946    Batchelder et al. ____ 260—645

OTHER REFERENCES

Kobe et al.: Industrial and Engineering Chemistry, vol. 42, No. 2, pp. 352 to 356 (1950).

Kobe et al.: Industrial and Engineering Chemistry, vol. 44, No. 6, pp. 1398 to 1401 (1952).

Kobe et al.: Industrial and Engineering Chemistry, vol. 46, No. 4, pp. 728 to 732 (1954).

L. DEWAYNE RUTLEDGE, *Primary Examiner.*

L. A. SEBASTIAN, *Assistant Examiner.*